April 16, 1968      A. E. DAUGHTRY      3,377,735
DEVICE FOR REMOVING EMBEDDED FISHHOOK
Filed April 29, 1966
FIG. 1
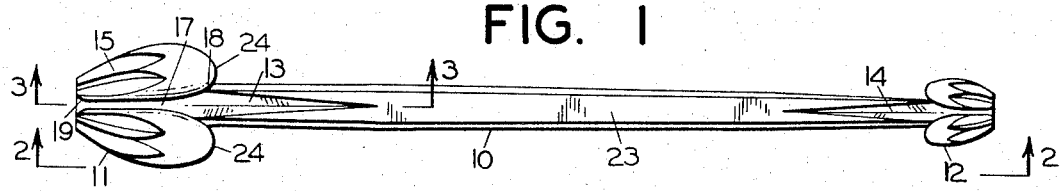
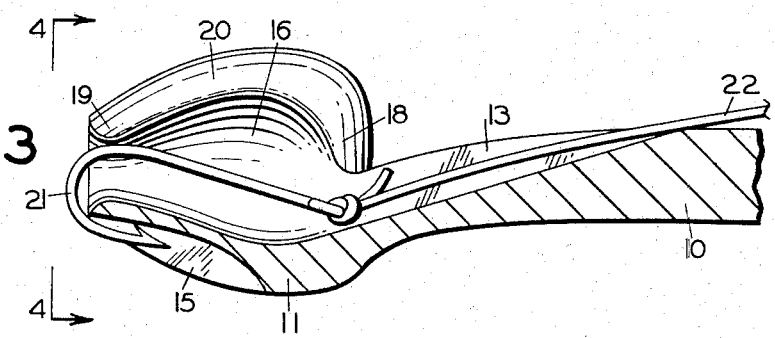
FIG. 3
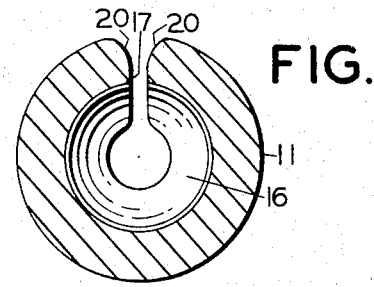
FIG. 5
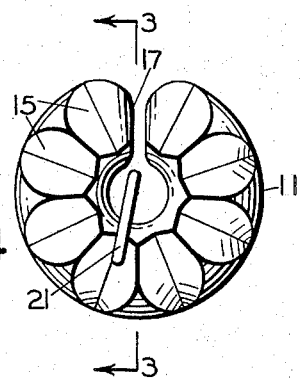
FIG. 4
FIG. 2
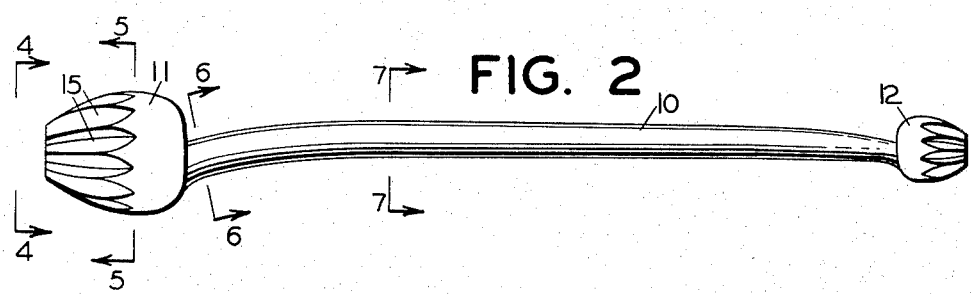
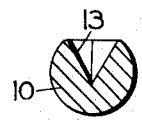
FIG. 6
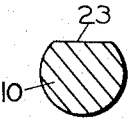
FIG. 7
INVENTOR.
ALBERT E. DAUGHTRY
BY F.R.Geisler
ATTORNEY

United States Patent Office 3,377,735
Patented Apr. 16, 1968

3,377,735
DEVICE FOR REMOVING EMBEDDED FISHHOOK
Albert E. Daughtry, 700 Wilkes Drive,
Eugene, Oreg. 97402
Filed Apr. 29, 1966, Ser. No. 546,258
4 Claims. (Cl. 43—53.5)

This invention is concerned with means by which a fishhook, embedded in a caught fish, can easily and quickly be removed from the fish without possibility of damage to the hook or line and without excessively mutilating the fish. For example some fish, such as the yellow perch, have small mouths and swallow the hook entirely, and without some special means for dislodging and freeing the hook it is necessary to remove the head of the fish in order to get the hook out.

The device of the present invention is somewhat similar to that described in United States Patent No. 2,519,098, issued Aug. 15, 1950, entitled, "Fishhook Remover," but has been developed as a modification of and an improvement upon the patented device.

While the device of the patent above referred to has proved capable of being utilized somewhat satisfactorily in the manner described in the patent, it has been found that the use of device of the patent involves unnecessary inconveniences, annoyances and delays, especially when employed hurriedly by an impatient fisherman, and that these defects have prevented such device from having a more widespread appeal to the general public.

The special object of this invention accordingly is to provide an approved fishhook remover of this same type which will be simpler and easier to use, which can be operated more quickly and with less attention on the part of the user, and thus which will be better suited to meet the popular demand.

The improved construction of the device of the present invention, the manner in which it is employed, and its advantages in use will be briefly described and explained with reference to the accompanying drawings, wherein:

FIG. 1 is a side elevation of the entire device;

FIG. 2 is a similar side elevation, but with the device rotated 90° from the position of FIG. 1;

FIG. 3 is a fragmentary sectional elevation taken on line 3—3 of FIG. 1, drawn to a larger scale, and also a section on the line 3—3 of FIG. 4 and illustrating the fishhook and line being engaged by the device for the hook removal;

FIG. 4 is an end elevation taken on the line indicated at 4—4 of FIGS. 2 and 3 and drawn to the same scale as FIG. 3;

FIG. 5 is a section on line 5—5 of FIG. 2 drawn to the same scale as FIGS. 3 and 4;

FIG. 6 is a section on line 6—6 of FIG. 2 drawn to the same scales as FIGS. 3 and 4; and FIG. 7 is a section on line 7—7 of FIG. 2 drawn to the same scale as FIGS. 3 and 4.

Referring first to FIGS. 1 and 2, the device, which is preferably though not necessarily made of plastic, comprises an elongated central shaft or stem member 10 carrying a pair of integral knobs 11 and 12 at the respective ends. These knobs are of similar formation and shape, but one of them (thus the knob 11 as shown on the left of FIGS. 1 and 2) is considerably larger than the other, and the member 10 gradually decreases in cross sectional size from the larger knob 11 to the smaller knob 12.

The member 10 is formed with a pair of substantially V-shaped, longitudinally aligned grooves 13 and 14 beginning near each end of the member 10 and leading down into the knobs 11 and 12 respectively.

Since the end knobs 11 and 12 are similar, differing only in size, it will suffice to describe one of them only, namely the larger knob 11. As shown in FIGS. 1 and 2, the surface of the knob 11 beginning at the juncture of the knob 11 and the member 10, is rounded and is broken only by a substantially longitudinal slit to be described later. The diameter of this surface increases rapidly from its juncture with the member 10 for about one-third of the axial length of the knob. From then on the diameter of the knob surface decreases constantly to the outer end of the knob. The surface of this decreasing diameter portion is formed with a series of identical, adjacent V-shaped grooves 15 extending to the outer end of the knob and causing this portion of the knob to present identical slightly converging, longitudinally-extending spaced teeth.

The interior of the knob 11 (FIG. 3) is hollow and provides a chamber 16 open at both ends. The groove 13 of the member 10 leads down into the chamber 16, as shown in FIG. 3. A slit 17 (FIG. 1) extends longitudinally through one entire side of the knob 11 into the chamber 16. The center line of this slit extends along in the same plane as the center line of the groove 13.

The width of the slit 17 in the knob 11 increases from the longitudinal center of the slit towards the inner and outer ends of the knob, and the width of this slit at the inner end of the knob corresponds approximately to the width of the top of the groove 13 at the point where this groove leads into the inner end of the knob. Each of the two opposed walls of the slit 17 is rounded at the inner end, as indicated at 18 in FIG. 1, up to the point where these walls meet the top edges of the groove 13 respectively, and the inner end of the knob 11 at its juncture with the member 10 beyond each side of the groove 13 forms a rounded shoulder 24 referred to later. The opposite or outer end of each of the walls of the slit is also rounded, as indicated at 19 in FIG. 1, where these walls meet the opening at the outer end of the chamber 16 and the outer end of the knob. Also the top edge of each wall of the slit 17, where the slit wall meets the outer surface of the knob, is rounded transversely, as indicated at 20 in FIG. 5. The bottom or inside edge of each wall of the slit 17 is rounded transversely as it merges into the wall of the chamber 16. Consequently there are no corners or sharp edges on the walls of the slit 17 on which the fishline can catch. This is one of the important improved features of the device.

In the operation of the device, when it is desired to remove the hook which has been secured in the fish, the fishline is held sufficiently taut to enable the line to be passed through the slit 17 into the bore or chamber 16 of the knob 11. This is most quickly and easily done by catching the line behind one of the shoulders 24 on the inner end of the knob 11 which will cause the line to slip into the groove 13 and into the slit 17, and is done equally well from one side or the other and with equal facility by either a right- or left-handed person. With the line thus extending along in the groove 13 and through the chamber 16 and out through the outer end of the knob 11, the device is slid along substantially longitudinally relatively with respect to the line, towards the fishhook until the end of the shank of the fishhook 21, attached to the end of the line 22, extends into the chamber 16. Thereupon continued end thrust on the device, and thus inward thrust on the hook will cause the prong or barb of the hook to be received into one of the grooves 15 between the teeth on the outer surface of the knob at the outer end of the knob, bringing the hook substantially into the relative position indicated in FIG. 3.

With the hook in this position and the line held taut in the device, the hook can be withdrawn from the fish without any difficulty. Should the hook be embedded too firmly or deeply in relatively tough flesh of the fish, then a further inward thrust of the device with the hook, followed by a slight oscillatory movement of the device will be sufficient to cause a cutting action to take place in the flesh around the hook by the adjacent teeth at the end of the knob, which will then suffice to enable the hook to be pulled free with the device.

When the hook has been removed from the fish, the loosening of the line with respect to the device will enable the hook and line to drop freely from the device.

As it is apparent from FIGS. 1 and 2, the two knobs 11 and 12 are made a different size for use with hooks of correspondingly different size, but the manner in which both knobs are used with hooks of appropriate size is identical.

One of the annoyances and delays encountered with the use of the fishhook remover described in U.S. Patent No. 2,519,098, above referred to, has been the fact that the fishline must be separately placed in the slit in the knob as a preparatory step. With the slit spirally shaped and formed with sharp edges this necessitates a certain amount of attention and patience on the part of the user. This difficulty, however, is avoided in the device of the present invention since the bringing of the knob into contact with the taut line, with possibly a partial rotation of the device and knob, will be all that is required to bring the line into engagement with a shoulder 24 and a rounded inner end 18 of the slit 17 and then into place in the knob. This can be done by the user of the device even without looking at the knob.

Preferably, although not necessarily, the elongated member 10 is formed with a flat surface 23 extending longitudinally along one side, with the longitudinal center line of this flat surface extending in the same plane as the center lines of the two grooves 13 and 14 leading into the knobs 11 and 12 respectively, and also extending in the same plane as the center lines of the slits in the two knobs. The flattened surface on the member 10 enables the user of the device, grasping the device by the member 10, to feel the flattened side and thus to know immediately, without looking at the device, where the slit in each knob is located.

A second difficulty encountered with the use of the fishhook remover of the patent in question has been due to the fact that when the hook has been removed from the fish the hook and line will not drop freely from the remover, but on the contrary, the line must then be manually disengaged by being lifted out from the slit in the knob, since the knob and slit in the device of the patent were purposely so designed and constructed that the line would be temporarily locked within the knob for the operation of removing the hook from the fish. Not only has this temporary locking of the line in the knob been found to be entirely unnecessary, but the additional effort and time required in subsequently freeing the line from the knob after the hook has been removed from the fish have been found to be a source of annoyance, especially when the entire operation is endeavored to be performed by an impatient user as quickly as possible.

In the present invention the knob and slit have been re-designed in order to achieve the further feature enabling the line to drop freely from the device of its own accord when the hook has been removed from the fish.

Thus the improved device of the present invention is not only simpler and more practical to use than that of the patent in question, but the engaging of the line and hook by the device and the subsequent disengaging of the line and hook from the device can readily be done by the user while not even looking at the device.

I claim:

1. A fishhook removing device comprising a shaft member, a knob mounted at the end of such shaft member, said knob being hollow and having an interior chamber open at each end of said knob, said shaft member having a substantially V-shaped groove beginning near said end of said shaft member and leading down into the end of said knob chamber, said knob having a longitudinal slit extending through one side of said knob for the entire length of said knob leading into said knob chamber, the longitudinal center line of said slit extending in the same plane as the center line of said groove, the width of said slit increasing from the middle portion of said slit to the ends of said slit, the intersections of the walls of said slit with the inner and outer ends of said knob and the intersections of the walls of said slit with the outer surface of said knob and with the wall of said chamber being rounded, and said walls of said slit at said inner end of said knob merging into the walls of said groove respectively, whereby the fishhook line can be easily and freely received into and discharged from said knob as desired.

2. The device of claim 1 with the addition of a second slitted knob at the opposite end of said shaft member, and with the addition of a second similar groove in said shaft member leading to said second knob, the center line of the slit in said second knob and the center line of said second groove extending in the same plane as the center lines of said first mentioned groove and said slit in said first mentioned knob.

3. The device of claim 1 with the inner end of said knob at its juncture with said shaft member beyond each side of said groove formed into a rounded shoulder.

4. The device of claim 1 with said shaft member formed with a flat surface extending longitudinally along said shaft member and perpendicular to the plane of said center lines of said slit and of said groove.

References Cited

UNITED STATES PATENTS

| D. 157,255 | 2/1950 | Hamel. | |
| 253,363 | 2/1882 | Foard | 43—53.5 |
| 1,611,544 | 12/1926 | Maurus | 43—53.5 |
| 2,519,098 | 8/1950 | Aye | 43—53.5 |

FOREIGN PATENTS 1,291,992  3/1962  France.

SAMUEL KOREN, *Primary Examiner.*

J. H. CZERWONKY, *Assistant Examiner.*